(12) United States Patent
Shin et al.

(10) Patent No.: US 7,774,541 B2
(45) Date of Patent: Aug. 10, 2010

(54) STORAGE APPARATUS USING NON-VOLATILE MEMORY AS CACHE AND METHOD OF MANAGING THE SAME

(75) Inventors: Dong-kun Shin, Seoul (KR); Shea-yun Lee, Seoul (KR); Jang-hwan Kim, Suwon-si (KR); Dong-hyun Song, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 272 days.

(21) Appl. No.: 11/601,819

(22) Filed: Nov. 20, 2006

(65) Prior Publication Data

US 2007/0150654 A1 Jun. 28, 2007

(30) Foreign Application Priority Data

Dec. 27, 2005 (KR) .................. 10-2005-0130795

(51) Int. Cl.
*G06F 12/02* (2006.01)
(52) U.S. Cl. .................. 711/113; 711/3; 711/103
(58) Field of Classification Search .......... 711/103, 711/113, 3
See application file for complete search history.

(56) References Cited

U.S. PATENT DOCUMENTS

| | | | | |
|---|---|---|---|---|
| 5,404,485 | A * | 4/1995 | Ban | 711/202 |
| 5,485,595 | A * | 1/1996 | Assar et al. | 711/103 |
| 5,568,423 | A * | 10/1996 | Jou et al. | 365/185.33 |
| 5,832,493 | A * | 11/1998 | Marshall et al. | 707/101 |
| 5,860,082 | A * | 1/1999 | Smith et al. | 711/103 |
| 5,860,083 | A * | 1/1999 | Sukegawa | 711/103 |
| 5,907,856 | A | 5/1999 | Estakhri et al. | |
| 5,937,425 | A | 8/1999 | Ban | |
| 2002/0013879 | A1 * | 1/2002 | Han | 711/103 |
| 2003/0225961 | A1 * | 12/2003 | Chow et al. | 711/103 |
| 2004/0168018 | A1 * | 8/2004 | Aasheim et al. | 711/103 |
| 2004/0205314 | A1 * | 10/2004 | Babudri et al. | 711/163 |
| 2005/0132126 | A1 | 6/2005 | Lin et al. | |
| 2005/0132129 | A1 * | 6/2005 | Venkiteswaran | 711/103 |
| 2005/0182892 | A1 * | 8/2005 | Nakanishi et al. | 711/103 |
| 2005/0204187 | A1 * | 9/2005 | Lee et al. | 714/8 |
| 2005/0246487 | A1 * | 11/2005 | Ergan et al. | 711/113 |
| 2005/0273550 | A1 * | 12/2005 | Chevallier et al. | 711/103 |
| 2006/0288153 | A1 * | 12/2006 | Tanaka et al. | 711/103 |
| 2007/0150647 | A1 | 6/2007 | Shin et al. | |

FOREIGN PATENT DOCUMENTS

| | | |
|---|---|---|
| JP | 04213129 A | 8/1992 |
| JP | 5-11933 A | 1/1993 |

(Continued)

*Primary Examiner*—Shane M Thomas
(74) *Attorney, Agent, or Firm*—Sughrue Mion, PLLC

(57) ABSTRACT

A storage apparatus using a non-volatile memory, which retains data even after power interruption, as its cache and a method of managing the same are provided. The storage apparatus includes a main storage medium, a non-volatile memory used as a cache of the main storage medium, a region of the non-volatile memory being divided into a fixed region and a non-fixed region according to whether or not data is fixed, and a block management unit managing physical blocks by means of virtual addresses, the physical blocks being allocated to the non-volatile memory.

26 Claims, 13 Drawing Sheets

FOREIGN PATENT DOCUMENTS

| | | |
|---|---|---|
| JP | 05-257804 A | 10/1993 |
| JP | 09-081464 A | 3/1997 |
| JP | 09-128302 A | 5/1997 |
| JP | 10-116230 A | 5/1998 |
| JP | 11053261 | 2/1999 |
| JP | 2003-256289 A | 9/2003 |
| JP | 2005-528696 A | 9/2005 |
| KR | 1020050065715 A | 6/2005 |
| KR | 102005130822 A | 7/2007 |
| WO | 2004059624 A1 | 7/2004 |

* cited by examiner

FIG. 5

| VBN 0 | VBN 1 | VBN 2 | VBN 3 | VBN 4 | VBN 5 | VBN 6 | VBN 7 |
|-------|-------|-------|-------|-------|-------|-------|-------|
| PBN 5 | PBN 0 | -     | -     | -     | -     | PBN 7 | PBN 2 |

BLOCK MAPPING TABLE (240)

← FIXED REGION ALLOCATION DIRECTION

NON-FIXED REGION ALLOCATION DIRECTION →

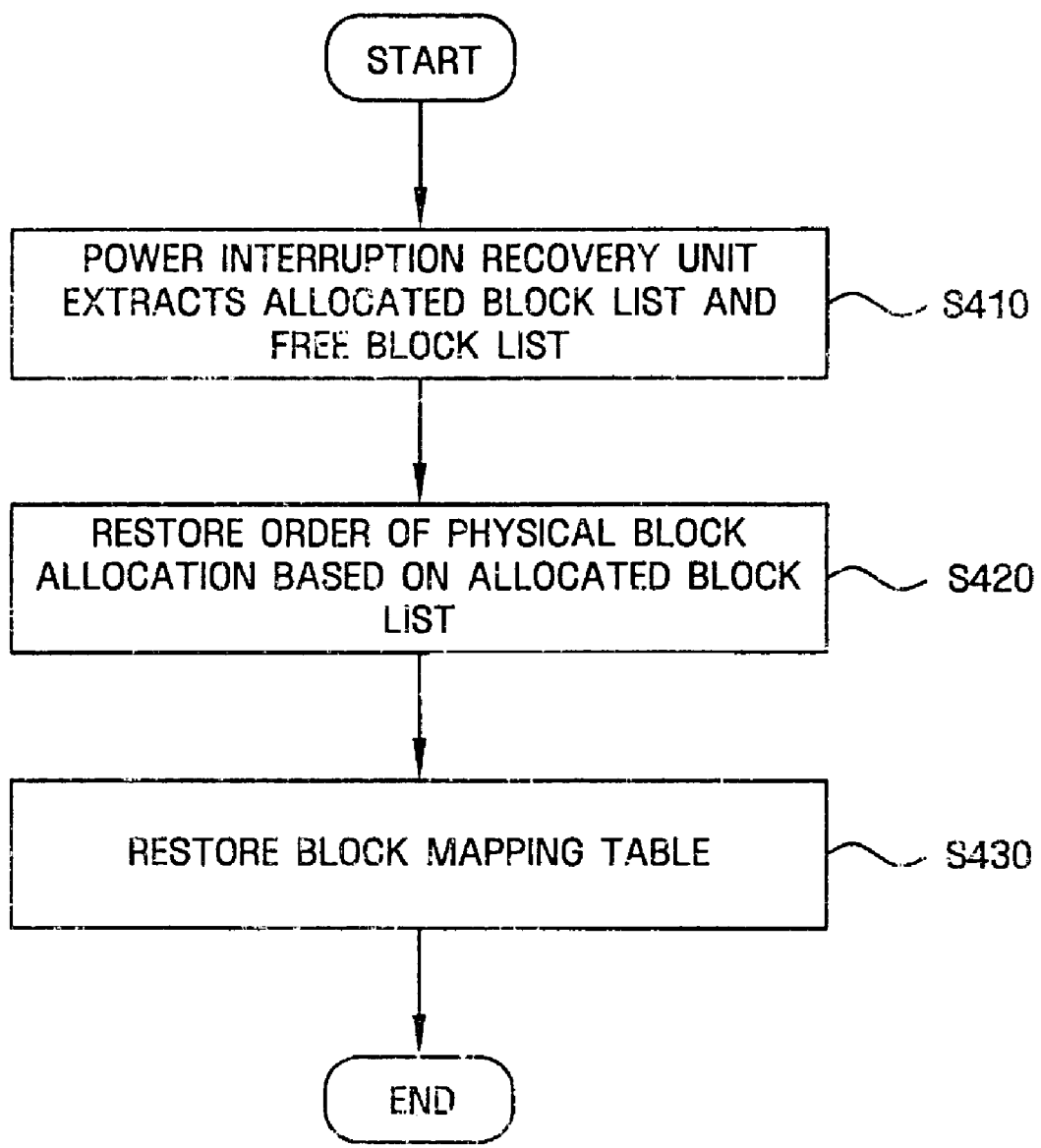

STORAGE APPARATUS USING NON-VOLATILE MEMORY AS CACHE AND METHOD OF MANAGING THE SAME

CROSS-REFERENCE TO RELATED APPLICATION

This application claims priority from Korean Patent Application No. 10-2005-0130795 filed on Dec. 27, 2005 in the Korean Intellectual Property Office, the disclosure of which is incorporated herein by reference in its entirety.

BACKGROUND OF THE INVENTION

1. Field of the invention

Aspects of the present invention relate to storage apparatuses using a non-volatile memory as a cache and methods of managing the same. More particularly, aspects of the present invention relate to storage apparatuses using non-volatile memory, which retains data even after power interruption, as a cache and methods of managing the same.

2. Description of the Prior Art

Referring to FIG. 1, a conventional storage apparatus 10 includes a host 11, a data buffer 12, and a main storage medium 13. The host 11 transmits/receives data to/from the main storage medium 13 in accordance with a user's command. The data buffer 12 buffers the difference in rate between the host 11 and the main storage medium 13.

Particularly, data transmitted from the host 11 is temporarily stored in the data buffer 12 until it is recorded in the main storage medium 13, and vice versa. The data buffer 12 of the storage apparatus 10 is generally composed of a volatile memory. This means that, when power supply to the main storage device 10 is interrupted, all data existing in the data buffer 12 is lost.

In order to increase access efficiency, the storage apparatus 10 uses a cache, which stores a part of the data that is to be stored in the main storage medium 13. When the host 11 reads data stored in the cache, access to the main storage medium 13 is unnecessary. This increases access efficiency.

However, the data buffer 12 cannot be used as a cache, even when the size of the data buffer 12 is increased, because it loses all data when the power supply is interrupted. In addition, the fact that the main storage medium 13 must be always supplied with power is an obstacle to reducing power consumption.

Therefore, it has recently been proposed to use a non-volatile memory as the cache of the storage apparatus 10 so that, when the host 11 reads/writes data from/to the non-volatile memory, power supply to the main storage medium 13 is interrupted so as to reduce the power consumption.

However, use of a non-volatile memory as the cache of the storage apparatus 10 has the following problems: data must be efficiently managed according to whether or not it is fixed. Particularly, the non-volatile memory has a fixed region, in which data is fixedly positioned all the time, and a non-fixed region in which position of data is changed frequently. These regions must be managed efficiently. In addition, a method of protecting data against unexpected power interruption is necessary. There is also a need to provide a method of collecting blocks in order to minimize the time of power supply to the main storage medium 13, as well as a method of increasing the life of the non-volatile memory in consideration of the wear level of respective physical blocks in the non-volatile memory.

Laid-open Japanese Patent No. 2003-256289 discloses a system for maintaining the consistency of wear level of a flash memory system, the address of which can be designated as desired, by periodically deleting the designation of blocks, which have been grouped in the flash memory, according to a circular sequence (recording and deletion occur at both the bottom and top of a physical sector address). However, the system disclosed in Japanese Patent No. 2003-256289 does not propose a method of efficiently managing data in fixed and non-fixed regions, nor does it suggest protecting data against unexpected power interruption, or increasing lifespan based on block collection and wear level adjustment.

SUMMARY OF THE INVENTION

Accordingly, exemplary embodiments of the present invention overcome the above-mentioned disadvantages occurring in the prior art, and other disadvantages not described above. Also, the present invention is not required to overcome the disadvantages described above, and an exemplary embodiment of the present invention may not overcome any of the problems described above. An aspect of the present invention provides a storage apparatus using a non-volatile memory as its cache in such a manner that the non-volatile memory is separately managed by dividing it into fixed and non-fixed regions in accordance with whether or not data is fixed in the regions and blocks are collected for uniform wear level of the blocks, as well as a method of managing the same.

Another aspect of the present invention provides a storage apparatus using a non-volatile memory as its cache for easy recovery from unexpected power interruption and a method for managing the same.

In order to accomplish these objects, and others, there is provided a storage apparatus using a non-volatile memory as a cache, the apparatus including a main storage medium; a non-volatile memory used as a cache of the main storage medium, a region of the non-volatile memory being divided into a fixed region and a non-fixed region according to whether or not data is fixed; and a block management unit managing physical blocks by means of virtual addresses, the physical blocks being allocated to the non-volatile memory.

In accordance with another aspect of the present invention, there is provided a method of managing a storage apparatus using a non-volatile memory as a cache, the method including dividing a region of a non-volatile memory used as a cache of a main storage medium into a fixed region and a non-fixed region according to whether or not data is fixed and managing physical blocks allocated to the fixed region and the non-fixed region by means of virtual addresses allocated to the physical blocks, respectively.

BRIEF DESCRIPTION OF THE DRAWINGS

The above aspects of the present invention, and others, will become more apparent from the following detailed description with reference to the accompanying drawings, in which:

FIG. 5 shows a block mapping table according to an exemplary embodiment of the present invention;

FIG. 13 shows a method of recovering from power interruption according to an exemplary embodiment of the present invention.

DETAILED DESCRIPTION OF EXEMPLARY EMBODIMENTS OF THE PRESENT INVENTION

Figure 1:
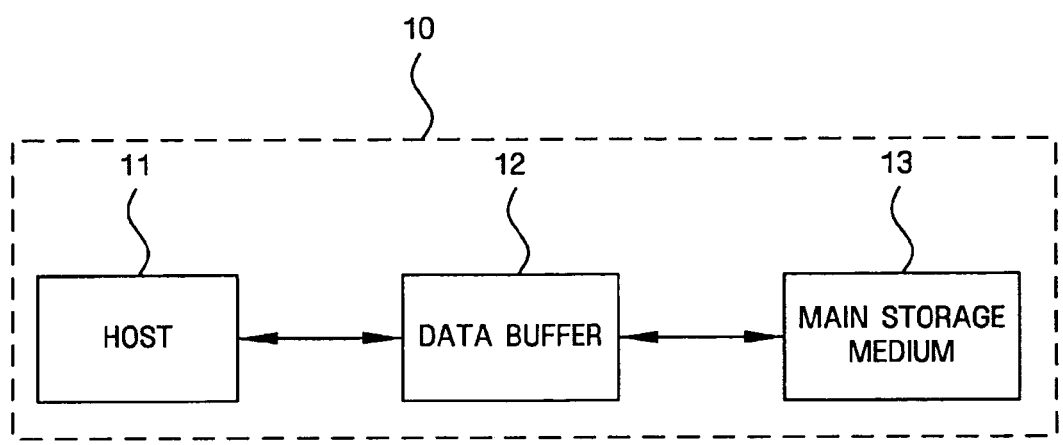
FIG. 1 shows a conventional storage apparatus.

Hereinafter, exemplary embodiments of the present invention will be described with reference to the accompanying drawings. The matters defined in the description such as a detailed construction and elements are nothing but examples provided to assist in a comprehensive understanding of the invention. Thus, it is apparent that the present invention can be carried out without those defined matters. In the following description of the exemplary embodiments of the present invention, the same drawing reference numerals are used for the same elements even in different drawings. Also, a detailed description of known functions and configurations incorporated herein will be omitted when it may obscure the subject matter of the present invention.

Exemplary embodiments of the present invention are described hereinafter with reference to flowchart illustrations relating to a storage apparatus using a non-volatile memory as its cache and a method of managing the same according to exemplary embodiments of the invention. It will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks.

These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the functions specified in the flowchart block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

And, each block of the flowchart illustrations may represent a module, segment, or portion of code, which comprises one or more executable instructions for implementing the specified logical function(s). It should also be noted that in some alternative implementations, the functions noted in the blocks may occur out of the order shown. For example, two blocks shown in succession may in fact be executed substantially concurrently or the blocks may sometimes be executed in the reverse order, depending upon the functionality involved.

Figure 2:
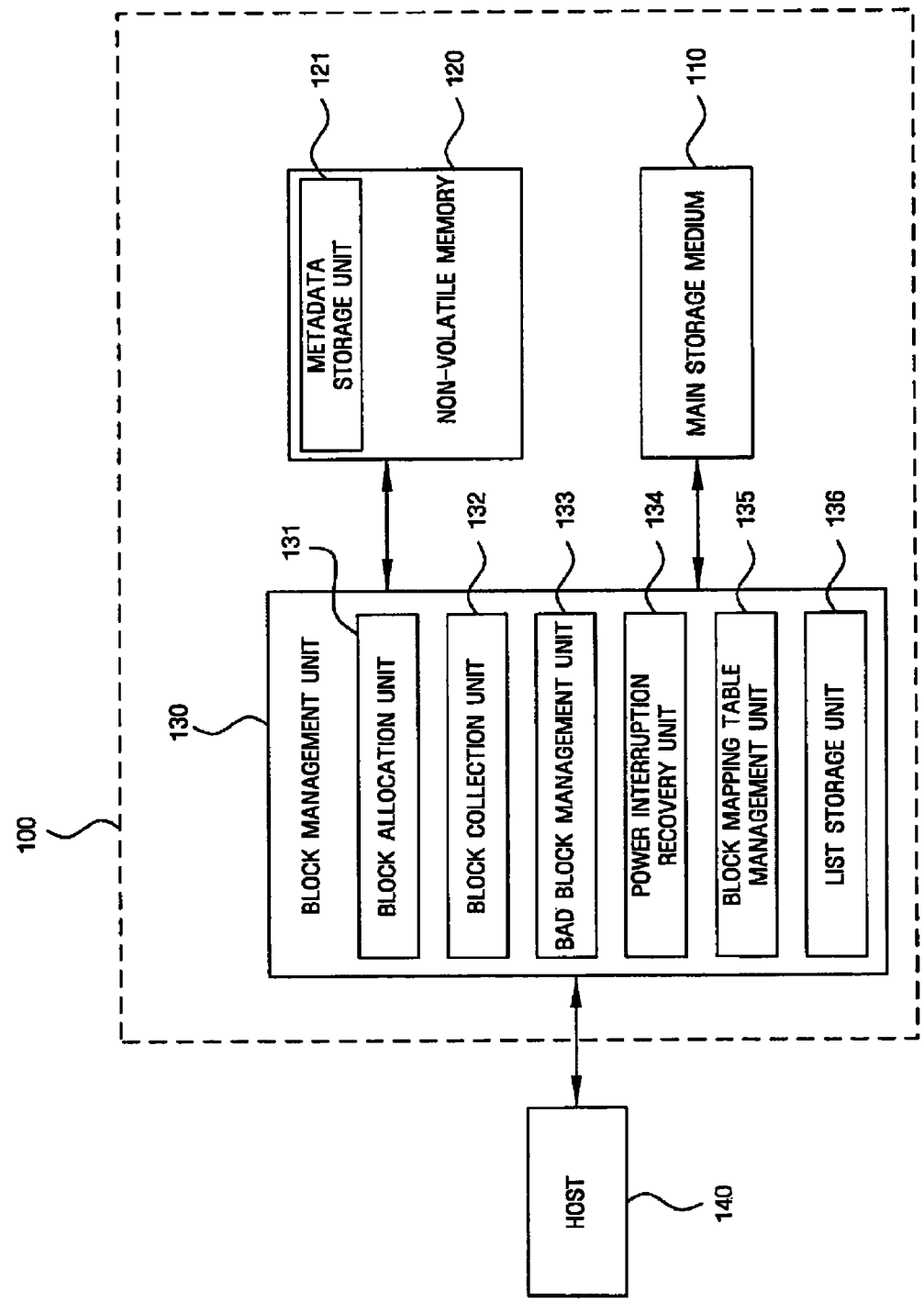
FIG. 2 shows a storage apparatus using a non-volatile memory as its cache according to an exemplary embodiment of the present invention.

FIG. 2 shows a storage apparatus using a non-volatile memory as its cache according to an exemplary embodiment of the present invention.

As shown, a storage apparatus 100 using a non-volatile memory as its cache according to an exemplary embodiment of the present invention may include a main storage medium 110, a non-volatile memory 120 used as the cache of the main storage medium 110, and a block management unit 130 for managing the Physical Block (PB) of the non-volatile memory 120 by means of virtual addresses.

It will be understood by those skilled in the art that, according to the present exemplary embodiment, the main storage medium 110 is a large-capacity storage medium, such as a hard disk drive, and the non-volatile memory 120 is, for example, a flash memory capable of retaining data even in the case of power interruption. The storage apparatus 100 using a non-volatile memory as its cache according to the present exemplary embodiment may be connected to a host 140, which transmits/receives data to/from the main storage medium 110 in accordance with the user's command. The host 140, in turn, may be connected to the block management unit 130.

The non-volatile memory 120 may be divided into a fixed region in which data is fixed and a non-volatile region in which data is changed frequently. The fixed region stores data that is supposed to permanently reside in the non-volatile memory 120 and is used as the cache of the main storage apparatus 110. In the non-fixed region, data frequently moves to/from the main storage medium 110.

The block management unit 130 may include a block allocation unit 131 for allocating PBs to the non-volatile memory 120; a block collection unit 132 for collecting allocated PBs; a bad block management unit 133 for managing bad blocks; a power interruption recovery unit 134 for recovering from power interruption; a block mapping table management unit 135 for managing the mapping relationship between the Physical Block Number (PBN) and Virtual Block Number (VBN) of the non-volatile memory 120; and a list storage unit 136 for storing an allocated block list and a free block list.

The block allocation unit 131 is adapted to allocate PBs to the fixed regions and non-fixed regions of the non-volatile memory 120 in accordance with the free block list stored in the list storage unit 136. The free block list contains vacant PBs, in which no data exists. The PBs of the free block list may be sorted in the order of PBN, which is based on their wear level. Particularly, the PBN of the least frequently used PB is in the first position on the free block list, and that the PBN of the most frequently used PB is in the last position on the free block list. The free block list is generally stored in a spare region of the non-volatile memory 120. The power interruption recovery unit 134 is adapted to reconstruct the free block list by using values stored in the spare region in the case of unexpected power interruption and rebooting, as will be described below in more detail.

Figure 3:
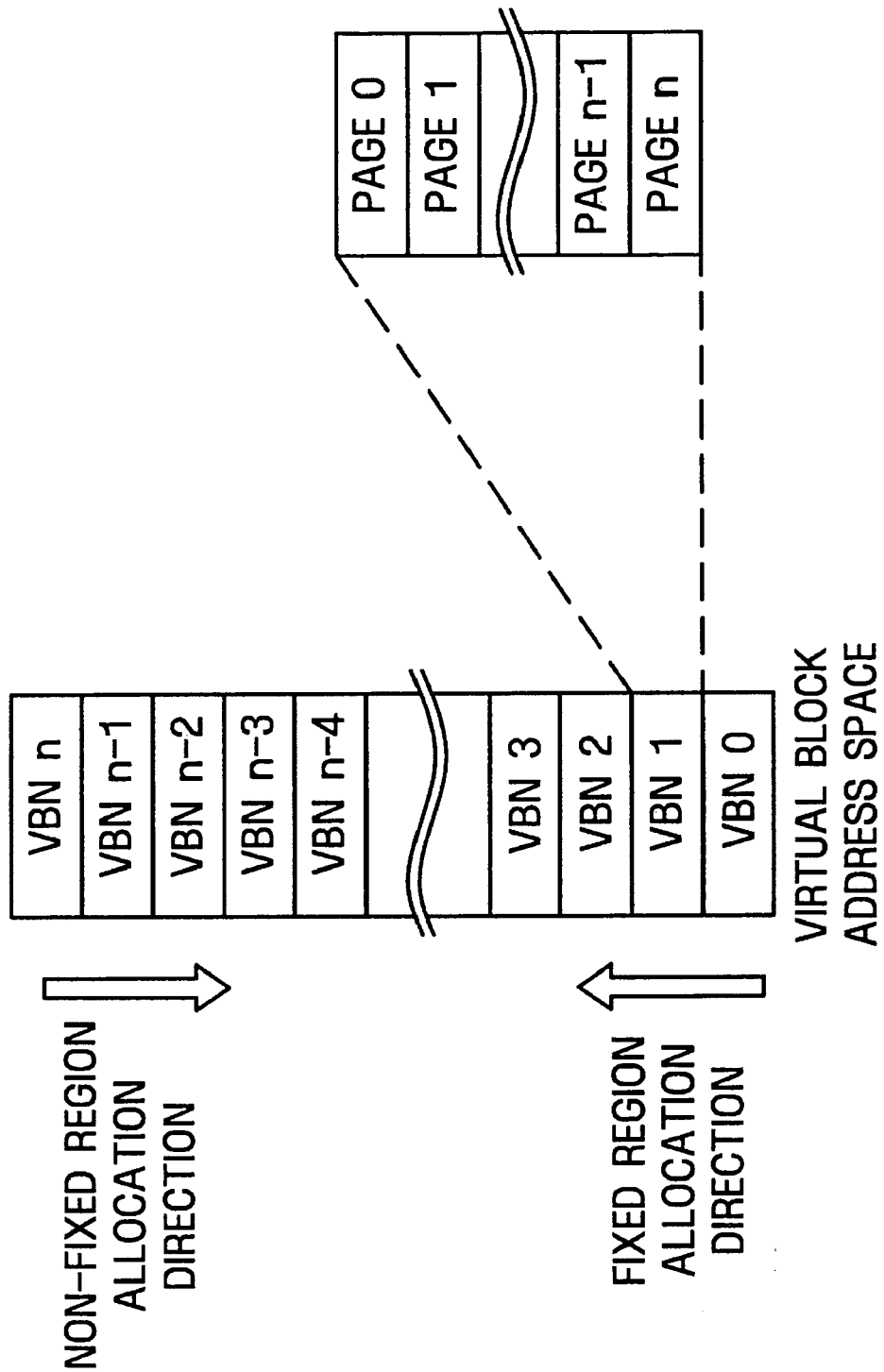
FIG. 3 shows a virtual block address space according to an exemplary embodiment of the present invention.

FIG. 3 shows a virtual block address space according to an exemplary embodiment of the present invention.

In order to allocate PBs to the fixed regions and the non-fixed regions of the non-volatile memory 120, the block allocation unit 131 may allocate VBNs of a virtual block address space to corresponding PBNs, as shown in FIG. 3. The VBNs of the virtual block address space may successively map onto the PBNs of the non-volatile memory 120 in the opposite directions, in order to differentiate the fixed regions and the non-fixed regions from each other. Respective VBNs in the virtual block address space may consist of a number of pages, and the virtual block address space may have a size larger than that of the physical address space.

The block allocation unit 131 then allocates the PB, which is in the first position on the free block list, to the fixed region or the non-fixed region. The block mapping table, in which the mapping relationship between the PBN of the allocated PB and the VBN is recorded, may be stored in the block mapping table management unit 135. As in the case of the virtual block address space, the block mapping table may similarly have successive allocation in the opposite directions, based on the fixed regions and the non-fixed regions. After allocating some PBs on the free block list to the fixed region or the non-fixed region, the block allocation unit 131 updates the allocated block list and the free block list, which are stored in the list storage unit 136. Specifically, the block allocation unit 131 removes the PBs, which have been allocated to the fixed region or the non-fixed region, from the free block list and adds the allocated PBs to the last portion of the allocated block list.

Figure 4:
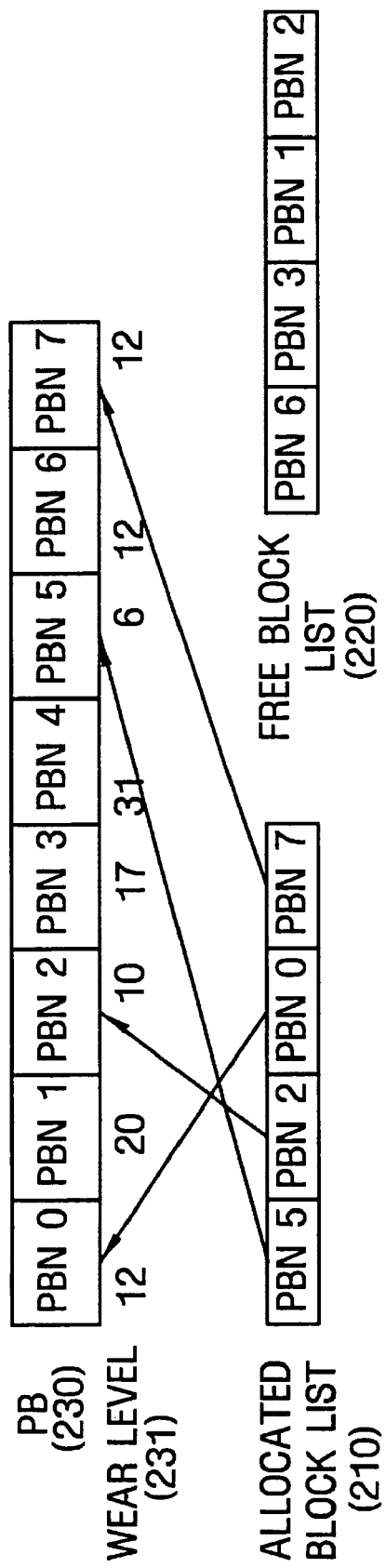
FIG. 4 shows an allocated block list and a free block list according to an exemplary embodiment of the present invention.

FIG. 4 shows an allocated block list and a free block list according to an exemplary embodiment of the present invention.

It is clear from the drawing that, according to the present exemplary embodiment, the allocated block list 210 enumerates the PBNs of allocated PBs 230 in order of increasing wear level 231, and the free block list 220 enumerates the PBNs of unallocated PBs 230 in the same order.

FIG. 5 shows a block mapping table, in which the PBNs on the allocated block list shown in FIG. 4 map onto VBNs, respectively.

It is clear from the drawing that, in the block mapping table 240 according to the present exemplary embodiment, the PBNs successively map onto the VBNs in the opposite directions, based on the fixed regions and non-fixed regions.

When data is recorded in the non-volatile memory 120, various types of metadata can be stored in the spare region together with the data. According to the present exemplary embodiment, the metadata may be stored in a metadata storage unit 121 of the non-volatile memory 120. The metadata stored in the metadata storage unit 121 may include, for instance, a Logical Block Address (LBA), fixed regions and non-fixed region data indicators, the wear level of blocks, and a restoration mark.

When LBAs map onto respective PBs of the allocated block list, the LBAs can be used for restoration after unexpected power interruption. The fixed region and the non-fixed region data indicators are used for differentiation between the fixed regions and the non-fixed regions, as well as restoration after power interruption. The wear level provides a standard for creating a free block list. The restoration mark is used for restoration after power interruption. Particularly, when the allocated block list and the free block list are connected and stored together in the non-volatile memory 120, a restoration mark may be made at the beginning of the free block list so that it is differentiated from the allocated block list. Those skilled in the art can understand that, when the allocated block list and the free block list are connected and stored together, they actually constitute a single list with a restoration mark made at the beginning of the free block list for differentiation between them.

The block collection unit 132 counts effective pages of respective PBs on the allocated block list. The block collection unit 132 may perform block collection from a PB having the smallest number of effective pages. When a PB has the smallest number of effective pages, it can be said that the PB has the least amount of effective data. On this ground, block collection begins from the PB with the smallest number of effective pages.

The block collection unit 132 allocates the PB that is in the first position on the free block list, so that the PB is positioned at the end of the allocated block list. The block collection unit 132 moves effective pages in a PB due for block collection to a block in the position of the allocated block list. After all effective pages are moved to the PB in the last position on the allocated block list, block collection unit 132 adds PBs, which have been subjected to block collection, to the free block list in the order of wear level.

For the sake of block collection, the block allocation unit 131 allocates the VBN of the virtual block address space to the PBN of the PB in the last position of the allocated block list so that the virtual block address space is updated.

Figure 6:
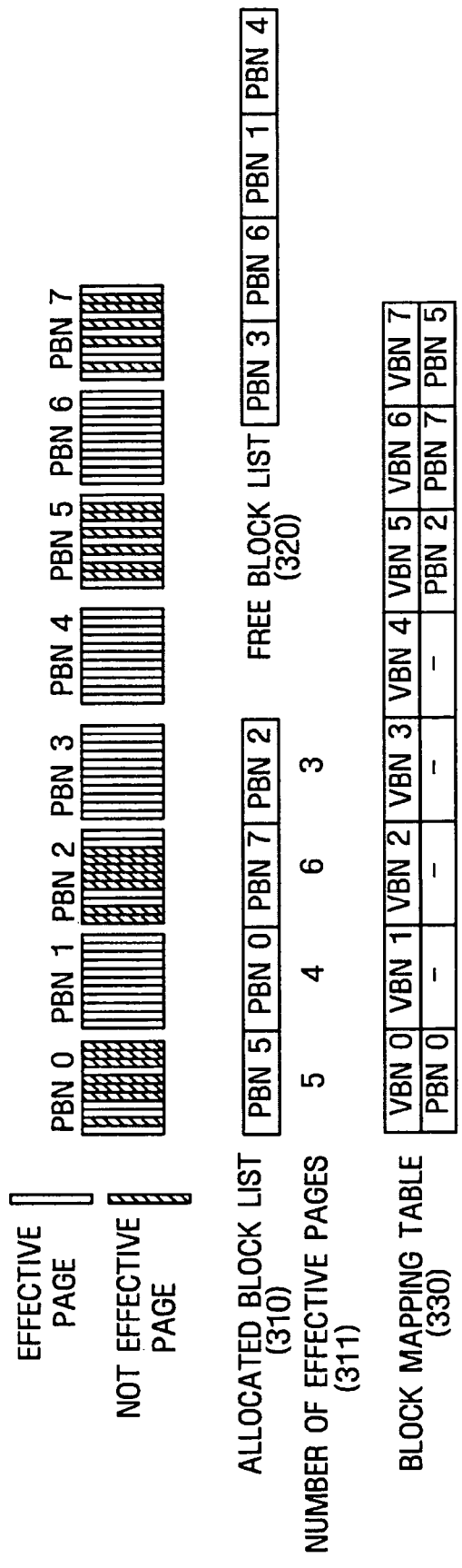
FIG. 6 shows an allocated block list, a free block list, and a block mapping table, before blocks are collected, according to an exemplary embodiment of the present invention.

FIG. 6 shows PBs, before block collection, according to an exemplary embodiment of the present invention.

It is clear from the drawing that the allocated block list 310 enumerates PBN 5, PBN 0, PBN 7, and PBN 2, the number of effective pages 311 of which are 5, 4, 6, and 3, respectively. The free block list 320 enumerates PBN 3, PBN 6, PBN 1, and PBN 4. In the block mapping table 330, the PBNs of the allocated block list 310 map onto respective VBNs in opposite directions, based on the fixed regions and the non-fixed regions.

Figure 7:
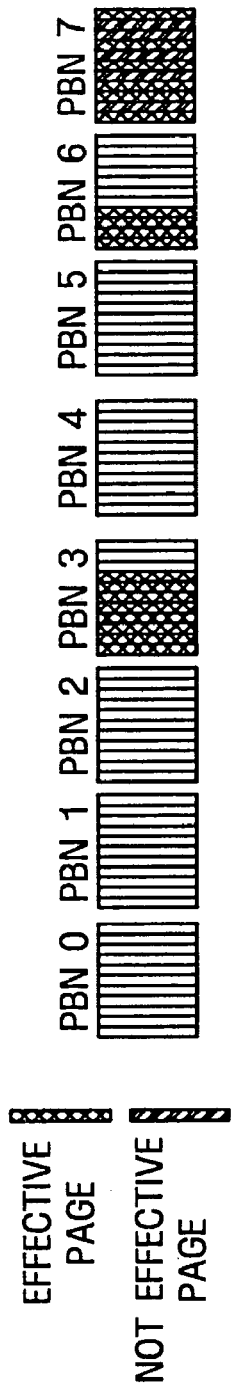
FIG. 7 shows an allocated block list, a free block list, and a block mapping table, after blocks are collected, according to an exemplary embodiment of the present invention.

FIG. 7 shows PBs, after block collection, according to an exemplary embodiment of the present invention. It will be assumed in the following description with reference to FIG. 7 that, for the sake of block collection, the effective pages of PBN 0 shown in FIG. 6 are moved to PBN 6, and those of PBN 2 and PBN 5 are moved to PBN 3.

It is clear from FIG. 7 that PBN 0, PBN 2, and PBN 5 (shown in FIG. 6) have been removed from the allocated block list 310 as a result of block collection and have been added to the free block list 320 in the order of wear level.

As shown in FIG. 7, in the block mapping table 330, PBN 7 retains its position, because it has not been subjected to block collection. In contrast, PBN 3 and PBN 6, which have been subjected to block collection and have been moved from the free block list 320 to the allocated block list 310, map onto new VBNs.

When a bad block occurs in a PB on the allocated block list, the bad block management unit 133 removes that particular PB from the allocated block list and moves data, which had been recorded in the removed PB, to a PB which has been newly allocated from the free block list 320. In order to move data that has been recorded in the bad block, the bad block management unit 133 inserts the PB, which has been newly allocated from the free block list, in the position of the removed bad block.

Figure 8:
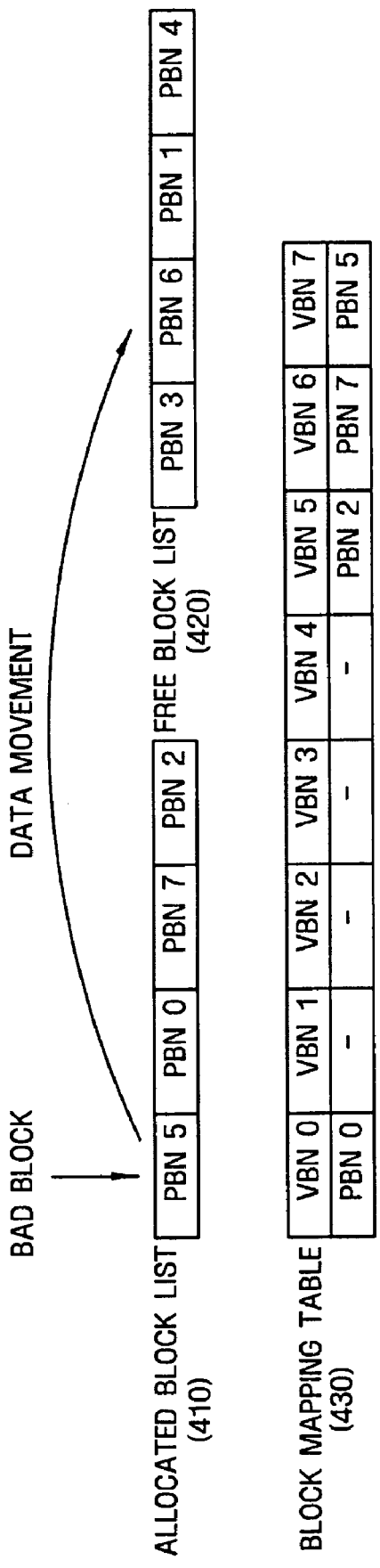
FIG. 8 shows an allocated block list, a free block list, and a block mapping table, before a bad block is processed, according to an exemplary embodiment of the present invention.

FIG. 8 shows the occurrence of a bad block according to an exemplary embodiment of the present invention.

As shown in FIG. 8, when a bad block occurs in PBN 5 of the allocated block list 410, the bad block management unit 133 receives a PB that is newly allocated from the free block list 420 and moves data, which has been recorded in the bad block, to the newly allocated PB. Before the bad block is removed, PBN 5 maps onto VBN 7 in the block mapping table 430. After removal of the bad block, the newly allocated PB maps onto VBN 7.

Figure 9:
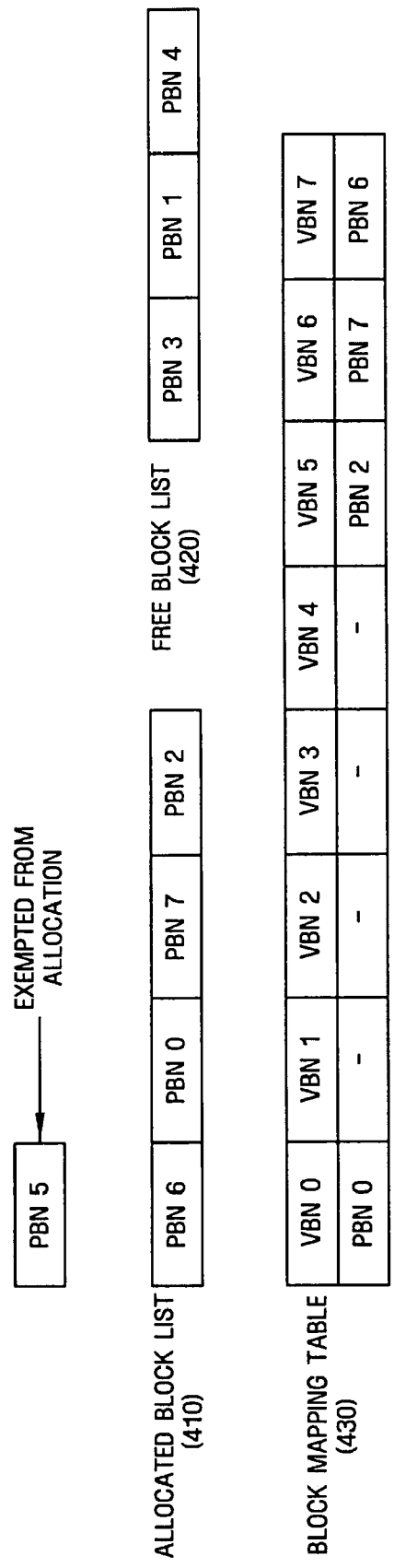
FIG. 9 shows an allocated block list, a free block list, and a block mapping table, after a bad block is processed, according to an exemplary embodiment of the present invention.

FIG. 9 shows the removal of a bad block according to an exemplary embodiment of the present invention.

As shown in FIG. 9, the bad block management unit 133 moves data recorded in PBN 5, which has a bad block, as shown in FIG. 8, to PBN 6, which has been newly allocated from the free block list 420, and inserts PBN 6 in place of PBN 5, which is neither, added to the free block list 420 nor is PBN 5 allocated. In the block mapping table 430, newly allocated PBN 6 maps onto VBN 7, which had previously mapped onto PBN 5 with a bad block.

The power interruption recovery unit 134 is adapted to recover from unexpected power interruption by means of the allocated block list and the free block list. To this end, the power interruption recovery unit 134 stores the allocated block list and the free block list in the spare region of the non-volatile memory 120, when both the allocated block list and the free block list change their order due to block collection or movement of data to the main storage medium 110. Particularly, once the allocated block list and the free block list are stored, they retain their order even in the case of unexpected power interruption. As a result, the order of allocation of PBs remains intact and, based on the LBA in the spare region, the latest data can be extracted. As such, the allocated block list and the free block list are stored only in the case of block collection or movement of data to the main storage medium 110 for easy restoration after power interruption. A restoration mark is made during block collection and is deleted during re-allocation, so that the allocated block list and the free block list can be differentiated. The block mapping table can also be restored by using the allocated block list.

Figure 10:
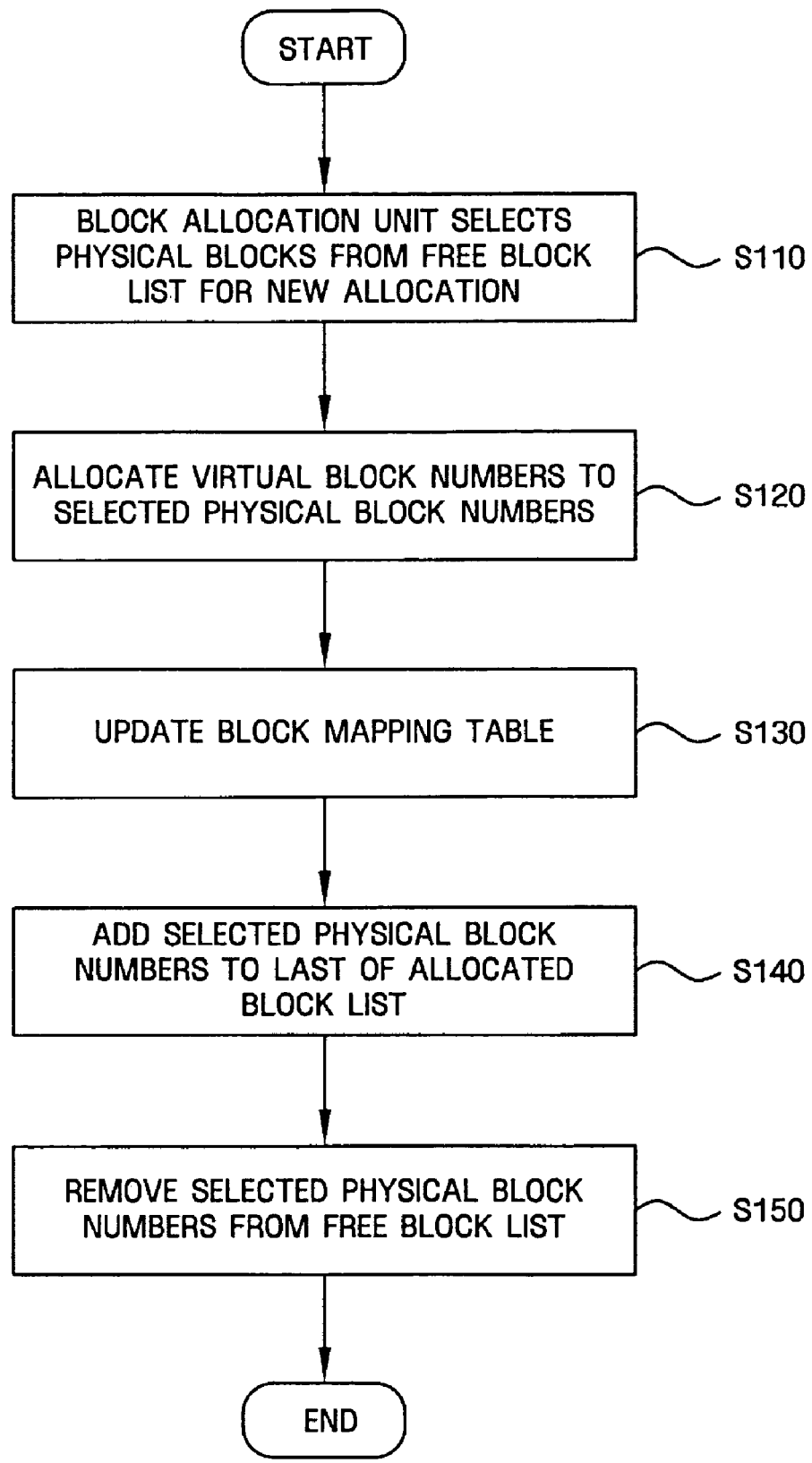
FIG. 10 shows a method of allocating blocks according to an exemplary embodiment of the present invention.

FIG. 10 shows a method of allocating blocks according to an exemplary embodiment of the present invention.

Referring to the drawing, in operation (S110) the block allocation unit 131 initially selects PBs from the free block list to be newly allocated to the fixed region or the non-fixed region. The block allocation unit 131 newly allocates a PB in the first position on the free block list. This is because the free block list enumerates PBs in order of increasing wear level, and the foremost PB has the lowest wear level.

In operation (S120), the block allocation unit 131 allocates VBNs to the selected PBNs. Particularly, the VBNs are successively allocated in the virtual block address space in opposite directions, based on fixed regions and non-fixed regions.

In operation (S130), the block allocation unit 131 updates the block mapping table, which indicates the mapping relationship between the PBNs and the VBNs.

In operation (S140), the block allocation unit 131 adds the selected PBNs to the last of the allocated block list and, in operation (S150), removes the selected PBNs from the free block list. The reason newly allocated PBNs are added to the last of the allocated block list is that, in the case of data update in a non-volatile memory 120, PBs are newly allocated and added without modifying previously written data. When PBNs are added to the last of the allocated block list in this manner every time new PBs are allocated, data written later may prove to be effective data. This can be used by the power interruption recovery unit 134 to recover from power interruption, as mentioned above.

Figure 11:
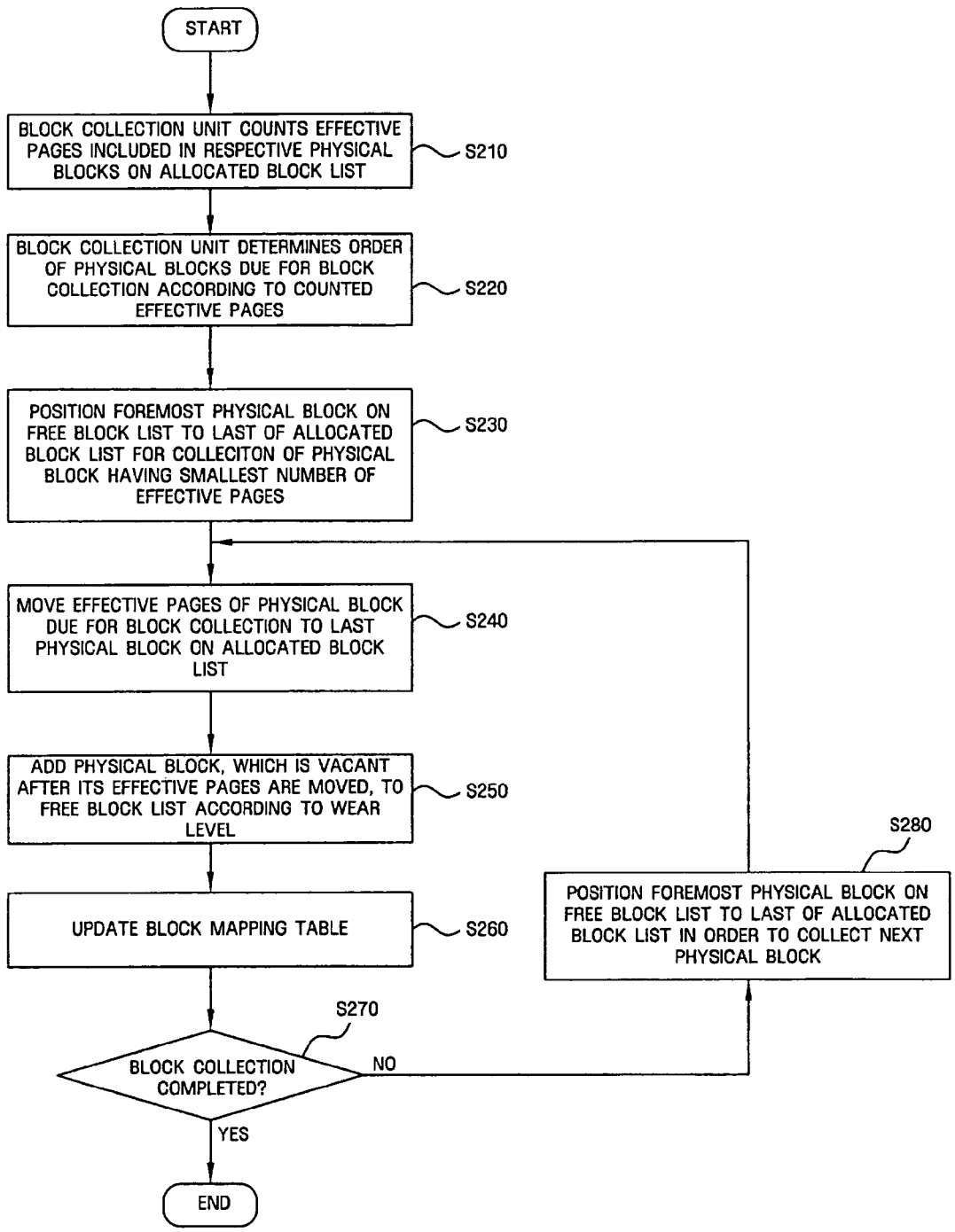
FIG. 11 shows a method of collecting blocks according to an exemplary embodiment of the present invention.

FIG. 11 shows a method of collecting blocks according to an exemplary embodiment of the present invention.

In operation (S210), referring to the drawing, the block collection unit 132 initially counts effective pages included in respective PBs on the allocated block list. This is for the purpose of collecting PBs, which contain at least a predetermined number of non-effective pages, and for newly allocating them.

In operation (S220), the block collection unit 132 determines the order of PBs for block collection in accordance with the number of effective pages. It will be assumed in the following description of the present exemplary embodiment that block collection starts from a PB having the smallest number of effective pages. In addition, block collection is performed to PBs having less than a predetermined number of effective or vacant pages.

In operation (S230), in order to collect a PB having the smallest number of effective pages in the determined order, the block collection unit 132 positions the foremost PBN on the free block list at the last of the allocated block list.

In operation (S240), the block collection unit 132 moves the effective pages of a PB due for block collection to the last PB on the allocated block list. In operation (S250), the block collection unit 132 adds PBs, which are vacant after their effectives are moved, to the free block list based on wear level. In operation (S260), the block collection unit 132 allocates VBNs to the PBNs that have been newly added to the allocated block list so that the block mapping table is updated.

In operation (S270), the block collection unit 132 determines whether or not all PBs due for block collection have been collected. If not, the block collection unit 132 performs operation (S280) and then repeats the above-mentioned operations (S240), (S250) and (S260) until all PBs due for block collection are collected. Particularly, in operation (S280), the block collection unit 132 positions the foremost PB on the free block list at the last of the allocated block list for the sake of block collection of the next PB. Then, the block collection unit 132 moves effective pages of a PB due for block collection to the last PB on the allocated block list; adds a PB, which is vacant after its effective pages have been moved, to the free block list based on wear level; and allocates a VBN to the PBN that has been newly added to the allocated block list so that the block mapping table is updated.

Figure 12:
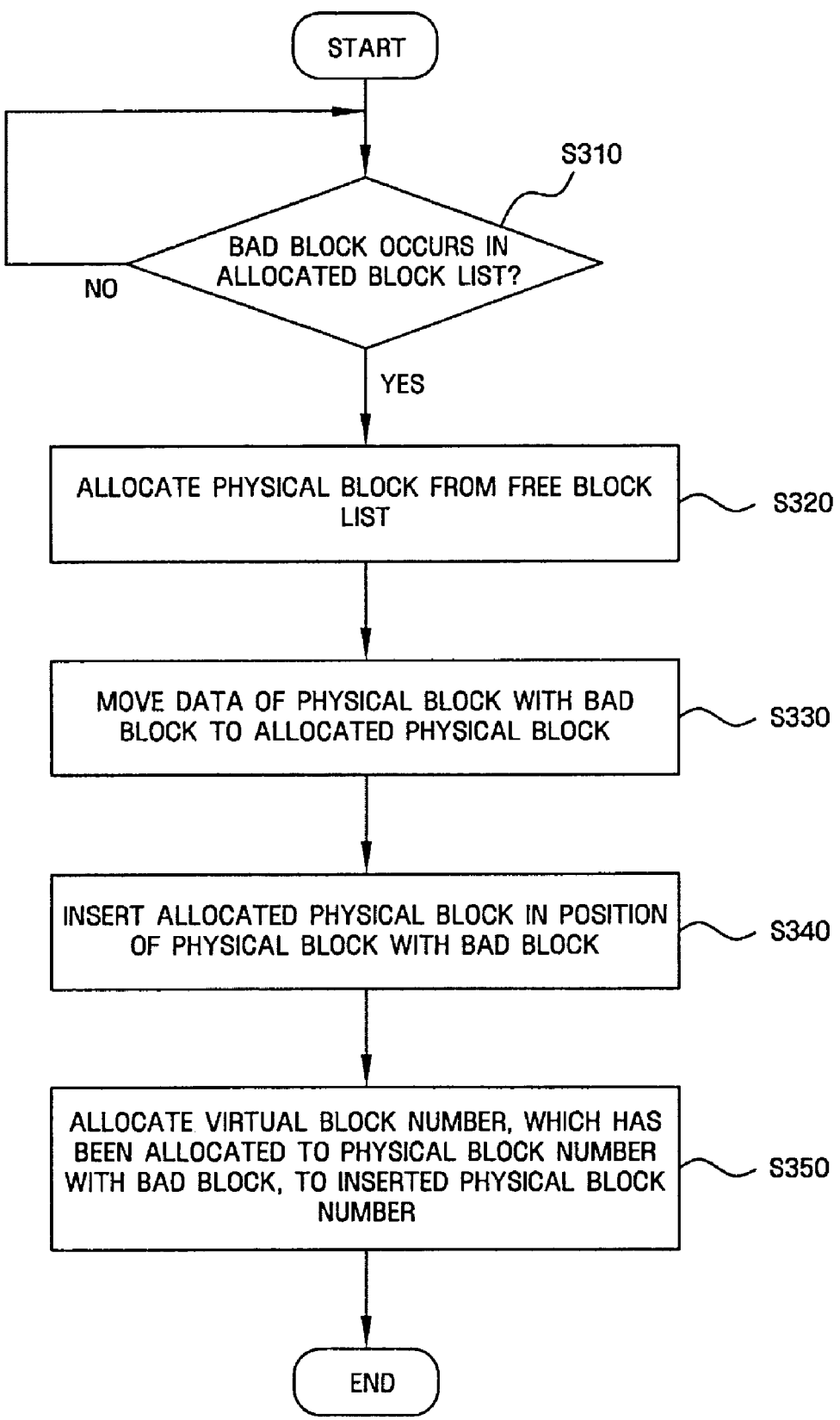
FIG. 12 shows a method of processing a bad block according to an exemplary embodiment of the present invention.

FIG. 12 shows a method of processing bad blocks according to an exemplary embodiment of the present invention.

Referring to FIG. 12, in operation (S310) the bad block management unit 133 initially determines whether or not any PB on the allocated block list has a bad block.

If so, in operation (S320) the bad block management unit 133 receives a PB that has been newly allocated from the free block list by the block allocation unit 131. Particularly, the foremost PB on the free block list is newly allocated in consideration of its wear level. It can be easily understood by those skilled in the art that, although the foremost PB on the free block list is allocated in the present exemplary embodiment of the invention, a PB next to the foremost PB may be allocated in order to avoid frequent change of the foremost PB, on which a restoration mark is made as mentioned above.

After a new PB is allocated, in operation (S330) the bad block management unit 133 moves the data of the PB, which has a bad block, to the newly allocated PB.

After data movement, in operation (S340) the bad block management unit 133 inserts the PB, to which data have moved, in the position of the PB with a bad block.

In operation (S350), the bad block management unit 133 assigns the VBN, which has been allocated to the PBN with a bad block, to a PBN inserted in the position of the PB with a bad block.

FIG. 13 shows a method of recovering from power interruption according to an exemplary embodiment of the present invention.

Referring to FIG. 13, in operation (S410), when power interruption occurs unexpectedly, the power interruption recovery unit 134 extracts the allocated block list and the free block list, both of which have been stored in the spare region of the non-volatile memory 120.

In operation (S420), the power interruption recovery unit 134 restores the order of PB allocation based on the allocated block list. When there is more than one PB having the same LBA, the power interruption unit 134 determines that the last written PB is effective.

In operation (S430), the power interruption recovery unit 134 restores the block mapping table based on the allocated block list.

The term "unit," as used herein, refers to, but is not limited to, a software or hardware component, such as a Field Programmable Gate Array (FPGA) or an Application Specific Integrated Circuit (ASIC), which performs certain tasks. A unit may advantageously be configured to reside on the addressable storage medium and may be configured to execute on one or more processors. Thus, a unit may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and units may be combined into fewer components and units or further separated into additional components and units.

As mentioned above, storage apparatuses using a non-volatile memory as a cache and methods of managing the same, consistent with exemplary embodiments of the present invention, have the following exemplary advantages.

The non-volatile memory is managed efficiently by dividing it into fixed regions and non-fixed regions according to whether or not data is fixed.

The wear level of respective blocks becomes uniform by means of block collection in the non-volatile memory. This increases the life of the memory. In addition, reduced wear level of the main storage medium decreases the power consumption during its operation.

The block mapping table can be restored from the allocated block list even in the case of unexpected power interruption, which guarantees safe data recovery.

Although exemplary embodiments of the present invention have been described above for illustrative purposes, those skilled in the art will appreciate that various modifications, additions and substitutions are possible, without departing from the scope and spirit of the invention as disclosed in the accompanying claims.

What is claimed is:

1. A storage apparatus comprising:
a main storage medium;
a non-volatile memory, which is used as a cache of the main storage medium, wherein a region of the non-volatile memory is divided into a fixed region and a non-fixed region according to whether or not data is fixed; and
a block management unit which manages physical blocks using virtual addresses, wherein the physical blocks are allocated to the non-volatile memory,
wherein the block management unit comprises:
a block allocation unit, which allocates physical blocks to the non-volatile memory;
a block collection unit, which collects the physical blocks allocated to the non-volatile memory;
a bad block management unit, which manages a bad block;
a power interruption recovery unit, which restores the storage apparatus using a logical block address, and fixed region and non-fixed region data indicators, stored in the non-volatile memory as a metadata in case of an unexpected power interruption;
a block mapping table management unit, which manages a block mapping table indicating a mapping relationship between physical block numbers and virtual block numbers that are allocated to the physical block numbers; and
a list storage unit, which stores an allocated block list enumerating allocated physical blocks and a free block list enumerating vacant physical blocks.

2. The storage apparatus of claim 1, wherein the block allocation unit is adapted to allocate a foremost physical block on the free block list to the fixed region or to the non-fixed region.

3. The storage apparatus of claim 2, wherein the free block list enumerates vacant physical blocks in order of increasing wear level.

4. The storage apparatus of claim 2, wherein the block allocation unit is adapted to position the physical block at an end of the allocated block list.

5. The storage apparatus of claim 4, wherein the block mapping table management unit is adapted to store a block mapping table having virtual block numbers, which are allocated to physical block numbers that are enumerated in the allocated block list and to physical block numbers that are enumerated in the free block list, and
wherein the block mapping table management unit allocates a virtual block number to a last physical block number on the allocated block list so that the block mapping table is updated.

6. The storage apparatus of claim 1, wherein the block collection unit is adapted to count effective pages of respective physical blocks on the allocated block list, and
wherein the block collection unit performs block collection beginning with a physical block having a smallest number of effective pages.

7. The storage apparatus of claim 6, wherein the block collection unit is adapted to position a physical block at an end of the allocated block list, and
wherein the block collection unit moves effective pages in a physical block due for block collection to the physical block at the end of the allocated block list.

8. The storage apparatus of claim 7, wherein the block collection unit is adapted to add a physical block to the free block list according to a wear level when the physical block due for block collection is vacant after effective pages are moved out.

9. The storage apparatus of claim 1, wherein the bad block management unit is adapted to move data out of a physical block on the allocated block list when the physical block comprises a bad block, to a physical block which is newly allocated from the free block list, and wherein the physical block comprising the bad block is exempted from allocation.

10. The storage apparatus of claim 9, wherein the bad block management unit is adapted to insert the physical block which is newly allocated from the free block list into a previous position of the physical block comprising the bad block, and
wherein the block mapping table management unit is adapted to allocate a virtual block number to a physical block number of the physical block which is inserted,
wherein the allocated virtual block number was previously allocated to the physical block comprising the bad block.

11. The storage apparatus of claim 1, wherein the power interruption recovery unit is adapted to extract the allocated block list and to restore the block mapping table in case of the unexpected power interruption.

12. The storage apparatus of claim 1, wherein the fixed region stores data that permanently resides in the non-volatile memory and is used as the cache of the main storage medium, and the non-fixed region stores data that frequently moves to or from the main storage medium.

13. The storage apparatus of claim 1, wherein the power interruption recovery unit restores the storage apparatus using the logical block address, the fixed region and non-fixed region data indicators, and a restoration mark, and
wherein the allocated block list and the free block list are stored together as a single list, and the restoration mark is at the beginning of the free block list and differentiates between the allocated block list and the free block list.

14. A method of managing a storage apparatus, the method comprising:
dividing a region of a non-volatile memory, which is used as a cache of a main storage medium, into a fixed region and a non-fixed region according to whether data is fixed or non-fixed; and
managing physical blocks allocated to the fixed region and allocated to the non-fixed region using virtual addresses which are allocated to the physical blocks, respectively,
wherein the managing the physical blocks comprises:
allocating physical blocks to the non-volatile memory;
collecting the physical blocks allocated to the non-volatile memory;
managing a bad block;
recovering from an unexpected power interruption using a logical block address, and fixed region and non-fixed region data indicators, stored in the non-volatile memory as a metadata;
managing a block mapping table which indicates a mapping relationship between physical block numbers and virtual block numbers allocated to the physical block numbers;
storing an allocated block list which enumerates allocated physical blocks; and
storing a free block list which enumerates vacant physical blocks.

15. The method of claim 14, wherein the allocating physical blocks comprises allocating a foremost physical block on the free block list to the fixed region or to the non-fixed region.

16. The method of claim 15, wherein the free block list enumerates vacant physical blocks in order of increasing wear level.

17. The method of claim 15, wherein the allocating physical blocks comprises positioning the physical block at an end of the allocated block list.

18. The method of claim 17, wherein the managing a block mapping table comprises:
storing a block mapping table having virtual block numbers, which are allocated to physical block numbers that are enumerated in the allocated block list and to physical block numbers that are enumerated in the free block list; and
allocating a virtual block number to a last physical block number on the allocated block list so that the block mapping table is updated.

19. The method of claim 14, wherein the collecting the physical blocks comprises:
counting effective pages of respective physical blocks on the allocated block list; and
performing block collection beginning with a physical block having a smallest number of effective pages.

20. The method of claim 19, wherein the collecting the physical blocks comprises:
positioning a physical block at an end of the allocated block list, and
moving effective pages in a physical block due for block collection to the physical block at the end of the allocated block list.

21. The method of claim 20, wherein the collecting the physical blocks comprises adding a physical block to the free block list according to a wear level when the physical block due for block collection is vacant after effective pages are moved out.

22. The method of claim 14, wherein the managing a bad block comprises:
moving data out of a physical block on the allocated block list when the physical block comprises a bad block, to a physical block which is newly allocated from the free block list; and
exempting the physical block comprising the bad block being from allocation.

23. The method of claim 22, wherein the managing a bad block comprises:
inserting the physical block which is newly allocated from the free block list into a position of the physical block comprising the bad block; and
allocating a virtual block number to a physical block number of the physical block which is inserted,
wherein the allocated virtual block number was previously allocated to the physical block comprising the bad block.

24. The method of claim 14, wherein the recovering from the unexpected power interruption comprises:
extracting the allocated block list; and
restoring the block mapping table in case of the unexpected power interruption.

25. The method of claim 14, wherein the fixed region stores data that permanently resides in the non-volatile memory and is used as the cache of the main storage medium, and the non-fixed region stores data that frequently moves to or from the main storage medium.

26. The method of claim 14, wherein the recovering is performed using the logical block address, the fixed region and non-fixed region data indicators, and a restoration mark stored in the non-volatile memory as a metadata, and
wherein the allocated block list and the free block list are stored together as a single list, and the restoration mark is at the beginning of the free block list and differentiates between the allocated block list and the free block list.

* * * * *